United States Patent [19]

Bishop

[11] Patent Number: 4,709,484
[45] Date of Patent: Dec. 1, 1987

[54] LEVER DISPLACEMENT GAUGE

[75] Inventor: Daniel E. Bishop, East Corinth, Me.

[73] Assignee: The United States of America as represented by the Secretary of the Army, Washington, D.C.

[21] Appl. No.: 913,791

[22] Filed: Sep. 29, 1986

[51] Int. Cl.$^4$ .............................................. G01B 5/08
[52] U.S. Cl. ............................... 33/169 R; 33/143 R; 33/168 B
[58] Field of Search ............ 33/168 R, 168 B, 169 R, 33/158, 143 R, 143 H, 143 M, 143 J, 147 H, 147 T, 147 J, 42

[56] References Cited
U.S. PATENT DOCUMENTS

| 3,015,891 | 1/1962 | Larson | 33/143 R |
| 3,422,541 | 1/1969 | Ott | 33/158 |

FOREIGN PATENT DOCUMENTS 229868  2/1944  Switzerland ..................... 33/143 H Primary Examiner—Harry N. Haroian
Attorney, Agent, or Firm—Norman L. Wilson, Jr.

[57] ABSTRACT

The measurement of displacements wherein the reference point, the point being displaced, is not fixed are not easily accomplished. Collective control systems in helicopters are representative of such displacements. Precise rigging of the collective control system is necessary. This invention provides a displacement gauge which makes this rigging easier to effect.

1 Claim, 4 Drawing Figures

LEVER DISPLACEMENT GAUGE

BACKGROUND OF THE INVENTION

This invention pertains to the measurement of displacements, particularly displacements wherein the reference point, the point being displaced, is not fixed. Collective control systems in helicopters are representative of such reference points. In one of its aspects this invention relates to maintaining control systems of helicopters. In another aspect, the invention provides an adjusting tool for use in rigging helicopter control systems.

The usual control of a helicopter during its operation is achieved by varing the pitch of its rotor blades. When the pitch angle of a particular rotor blade is changed as the rotor rotates, this change introduces cyclic pitch. Hence, the mechanical system which changes pitch angles of particular blades is the cyclic control system. If, on the other hand, the mechanical system changes the pitch angles of each of the rotor blades the same amount, collective pitch is introduced. Collective pitch is accomplished by the collective control system.

Cyclic and collective control are achieved in some helicopters by raising and lowering the swashplate. In other helicopter models, a sissors and sleeve assembly is employed. In either event, the swashplate or the sleeve must be raised, or lowered, within very precise and narrow limits in order to maintain the blade angles of attack within design limitations, and to coordinate those pitch angles with flight parameters, particularly negative collective control in the case of autorotation. To this end precise rigging of the collective control system is necessary. This invention provides a gauge which makes this rigging easier to effect.

SUMMARY OF THE INVENTION

By this invention a displacement gauge particularly suited for rigging collective pitch levers of helicopters is provided. The gauge's main component is an aligning plate having parallel slots perpendicular to its base. An indexing strip is held by the aligning plate by pin means passing through the slots of the aligning plate. These pin means hold the indexing strip parallel to the base of the aligning plate. The pin means are slideable within the slots to position the indexing strip any set distance from the aligning plate base. Locking means are provided for securing the indexing strip in the set position. A registering strip is spaced a predetermined distance from the indexing strip. A spacer between the indexing and registering strips maintains the predetermined distance. Pin means and locking means slideable in the slots are provided so that when the indexing strip is moved, the registering strip is moveable therewith along with the spacer which maintains the predetermined distance therebetween.

DETAILED DESCRIPTION OF THE INVENTION

Helicopters are designed for rotorhead rotation at a constant speed (revolutions per minute (RPM)). If a change in the angle of attack slows the rotor blade more power must be provided to maintain this constant RPM. A cam is provided in the fuel system to compensate for this slowing of the rotorhead, or droop. The required power is supplied automatically by an increase in injected fuel. It can be understood, then, that if the collective rigging is not correct, the symptoms are the same as if the droop can compensator is out of adjustment. Since it is a much more common occurrence, attention is generally directed to the cam. If, instead, the fault is in the collective control system, the effort will have been misspent. Hence, a quick and accurate means for first checking the collective control system is needed. This invention provides such means, in particular, a gauge, therefor.

This gauge, and its use, can be best understood by reference to the accompanying drawing which includes four figures.

Figure 1:
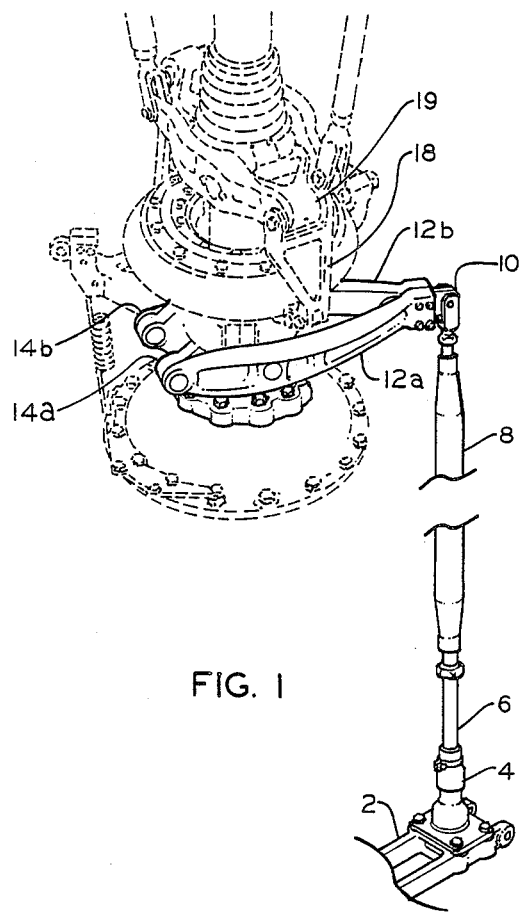
FIG. 1 is a diagramatic view showing the portion of a helicopter collective control system which actuates the swashplate.

Referring first to FIG. 1, through a series of control tubes and levers, either linked or hinged together, a pilot's collective control stick is operatively connected to actuating means carried by support 2. Beneath support 2 and not shown are conventional servo valves. Above support 2 is a hydraulic actuator 4 control tube 6 and actuator tube 8. By means of a clevis, not clearly visible at trunnion 10, actuator tube 8 is connected to the outer end of control levers 12a and 12b. The inner end of control levers 12a and 12b are pivotally connected to gibs 14a and 14b integral with the nonrotating portion of the swashplate support assembly. At 16 a cam pin is shown which passes through the nonrotating swashplate support assembly and into the swashplate sleeve within, to which it is connected. It is clear then that when control levers 12a and 12b are raised by actuator tube 8, the swashplate sleeve will also be lifted, extending rotating drive link 18, and scissors 19, thus changing the collective pitch. When the control levers 12 are lowered, so is the swashplate sleeve with the rotating hub on its upper end.

Since, as pointed out, the swashplate sleeve must be raised or lowered an exact amount, and since its initial position is not fixed, the measurement is actually the measurement of a displacement. Moreover, if the displacement must be within certain limits, a gauge rather than a measuring device is preferred. Such a gauge 20 is shown in FIG. 2.

Figure 2:
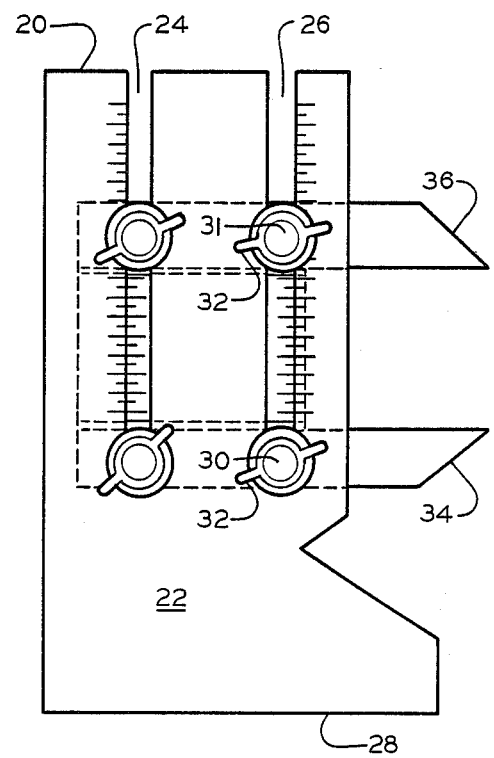
FIG. 2 is a plan view of the lever displacement gauge of this invention.

As is evident from FIG. 2, gauge 20 is in the form of a plate 22 having slots 24 and 26 perpendicular to its base 28. Slideable within slots 24 and 26, and passing therethrough, are four pins or bolts 30 and 31 provided with locking nuts such as wing nuts 32.

Bolts 30 are integral with an indexing strip 34 and bolts 31 are integral with a registering strip 36. These indexing and registering strips 34 and 36 can be locked in place by wing nuts 32.

Figure 3:
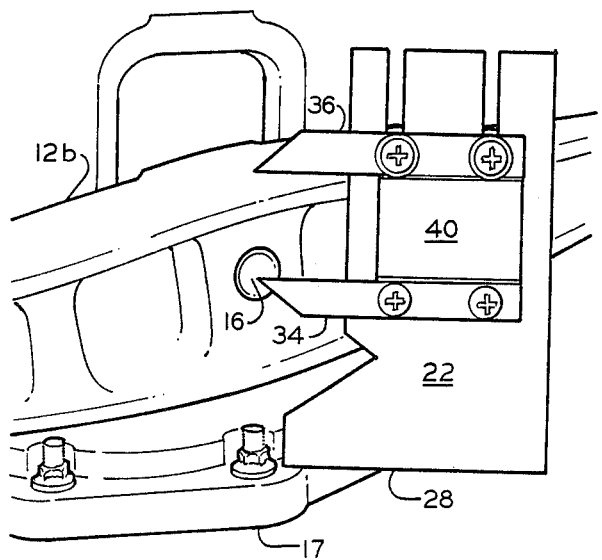
FIGS. 3 and 4 illustrates the use of the gauge in rigging the collective control system.
Figure 4:
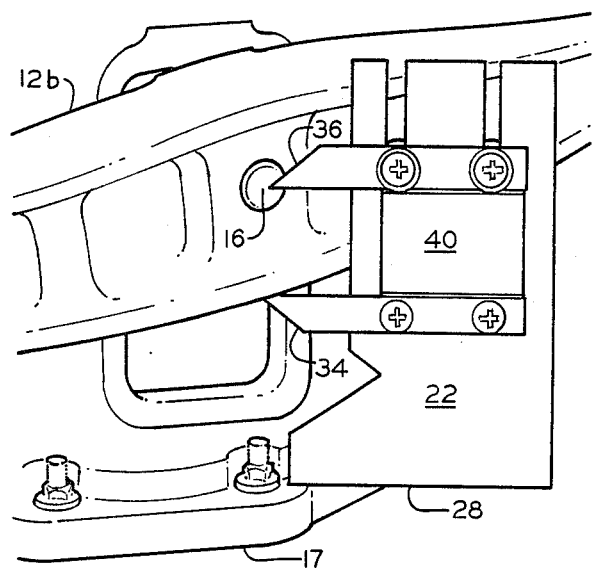

In many instances, the distance an element, in this invention a control rod, can be permitted to travel is fixed. The permitted distance is the maximum displacement. This maximum displacement is the distance between indexing strip 34 and registering strip 36. A spacer 40 maintains this predetermined distance. Spacer 40 can be an integral part of strips 34 and 36, as seen in FIGS. 3 and 4 or it can be grooved so that tongued strips 34 and 36 hold it between them as shown in FIG. 2. It will be evident that, with wing nuts 32 loosened, when indexing strip 34 is moved up or down within slots 24 and 26, registering strip 36 will move an equal amount. When indexing strip 34 is locked a certain distance from base 28, the distance determined by the height of spacer 40.

Having described displacement gauge of the invention its use will now be explained with reference to a UH-1H helicopter. In conjunction with FIG. 1 collective control levers 12a and 12b were described, along with cam 16. Control lever 12a and cam pin 16 are shown in FIGS. 3 and 4 which also show the utility of the invention. The rigging requirements for collective control lever 12a are set forth in Department of the Army Technical Manual TM 55-1520-210-23 on page 11-8. The instructions therein are to place the collective control stick full down. The position of the collective sleeve lever 12a should then be such that the distance from the center of cam roller 16 to the top of transmission cap 17 is in the range of 2.39 and 2.45 inches. The total travel collective pitch sleeve should then be 1.31 inches, ±0.06 inches.

In the displacement gauge herein the distance between indexing strip 34 and registering strip 36 is 1.31 inches. Referring to FIG. 3, with the displacement gauge 20 squarely on transmission cap 17 indexing strip 34 is set at the center of cam roller 16 as shown in FIG. 3, if the cam roller is in the 2.39 to 2.45 range indicated on the displacement gauge. Otherwise, adjustments are made so that cam roller 16 is in that range.

Having set the displacement gauge as shown in FIG. 3, the collective control stick is now moved to full up. If collective control lever 12a or 12b has traveled the required 1.31 inches, the pointer of registering strip 36 should be at the center of cam roller 16 as shown in FIG. 4. If it is not, appropriate rigging is indicated.

It can be seen that the displacement gauge of this invention obviates the necessity making an accurate measurement after setting the cam roller in position above the transmission cap. The first measurement insuring that the cam roller is in place is not as subject to error because a range is permitted. However, the second measurement or displacement must be exact (±0.06 inches). Since the measurement must be accurate, and since the displacement involves calculating the difference between the measured values, determining the travel of the pitch sleeve is not error-free. The displacement gauge of this invention helps overcome such errors.

It will be appreciated that the gauge, particularly plate 22, is wide enough so that the gauge can be held in a position perpendicular to transmission cap 17. If desired, the gauge can be provided with a broadened base 28 to make this more certain. Such variations will be obvious to those in this field. As an example, to ensure that the indexing and registering strips are completely horizontal collimating marks can be provided beside slots 24 and 26 and on spacer 40 as shown in FIG. 2. As another example, the gauge can be indexed with marks indicating 2.39 inches above its base, and 2.45 inches above the base so that it can be easily determined that indexing strip 34 is in that range. These and other ramifications which will occur to those skilled in the art are deemed to be within the scope of this invention.

What is claimed is:

1. A displacement gauge particularly suited for rigging collective pitch levers of helicopters comprising an aligning plate having parallel slots therein perpendicular to the base thereof, an indexing strip, a registering strip, two pins holding the indexing strip against the aligning plate parallel to the base of the aligning plate, one pin passing through each slot in the aligning plate and then through the indexing strip so that the indexing strip is slidable up and down against the aligning plate, two pins holding the registering strip against the aligning plate parallel to the aligning plate base, one pin passing through each slot in the aligning plate and through the registering strip so that the registering strip is slidable against the aligning plate, a spacer panel so disposed between the indexing strip and the registering strip as to be carried thereby so that when the indexing strip is moved to a set position the registering strip is moved therewith by the spacer panel therebetween to maintain the predetermined distance between them, and lock nuts affixed to the pins for securing the indexing and registering strips in the set position, the indexing strip and the registering strip being provided with tongues along the facing sides thereof, and the spacer being provided with grooves on its sides adjacent the tongues to be held thereby between the indexing and registering strips.

* * * * *